US011326612B2

(12) United States Patent
De' Longhi et al.

(10) Patent No.: US 11,326,612 B2
(45) Date of Patent: May 10, 2022

(54) FAN FOR VENTILATING OR CONDITIONING ENVIRONMENT

(71) Applicant: DE' LONGHI APPLIANCES S.R.L. CON UNICO SOCIO, Treviso (IT)

(72) Inventors: Giuseppe De' Longhi, Treviso (IT); Maddalena Renier, Roncade (IT); Francesca Prosperi, Codognè (IT); Enrica Monticelli, Varese (IT); Raffaele Toffolo, Treviso (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 68 days.

(21) Appl. No.: 16/303,066

(22) PCT Filed: May 18, 2017

(86) PCT No.: PCT/EP2017/061960
§ 371 (c)(1),
(2) Date: Nov. 19, 2018

(87) PCT Pub. No.: WO2017/198763
PCT Pub. Date: Nov. 23, 2017

(65) Prior Publication Data

US 2019/0301475 A1 Oct. 3, 2019

(30) Foreign Application Priority Data

May 18, 2016 (IT) ........................ 102016000051279
May 12, 2017 (IT) ........................ 102017000051934

(51) Int. Cl.
*F04D 25/10* (2006.01)
*F04D 29/44* (2006.01)
(Continued)

(52) U.S. Cl.
CPC ............ *F04D 25/10* (2013.01); *F04D 25/08* (2013.01); *F04D 29/441* (2013.01); *F04D 29/541* (2013.01); *F05D 2250/52* (2013.01)

(58) Field of Classification Search
CPC ........ F04D 25/08; F04D 25/10; F04D 25/105; F04D 29/40; F04D 29/403; F04D 29/44;
(Continued)

(56) References Cited

U.S. PATENT DOCUMENTS 2,255,759 A * 9/1941 Carpenter ............ F24H 3/0411 392/376
2,471,784 A * 5/1949 Seifner ................ F24H 3/0411 237/2 R
(Continued)

FOREIGN PATENT DOCUMENTS

CN 104863871 A 8/2015
CN 105351230 A 2/2016
(Continued)

OTHER PUBLICATIONS

Kurimoto JP 2014-134325, English Machine Translation, translated by Pro-Quest Jun. 22, 2020 (Year: 2014).*
(Continued)

*Primary Examiner* — David E Sosnowski
*Assistant Examiner* — Wayne A Lambert
(74) *Attorney, Agent, or Firm* — Marshall, Gerstein & Borun LLP

(57) ABSTRACT

A fan includes a main body with a vertical development with respect to a support base on which the main body is located in a condition of use. The main body defines an internal housing compartment.

20 Claims, 3 Drawing Sheets

(51) Int. Cl.
*F04D 29/54* (2006.01)
*F04D 25/08* (2006.01)

(58) Field of Classification Search
CPC ...... F04D 29/441; F04D 29/54; F04D 29/541; F05D 2250/52; F05D 2250/14; F05D 2250/141; F05D 2250/16; F05D 2250/33; F05D 2250/62; F05D 2250/711; F05D 2250/712; F05D 2250/72; F05F 5/16
See application file for complete search history.

(56) References Cited

U.S. PATENT DOCUMENTS

| | | | | | |
|---|---|---|---|---|---|
| 2,583,374 | A * | 1/1952 | Hoffman | F04D 25/14 | 454/344 |
| 3,047,208 | A * | 7/1962 | Coanda | F02K 1/36 | 417/174 |
| 3,429,527 | A * | 2/1969 | Whittley | B64C 29/0041 | 244/12.3 |
| 3,500,738 | A * | 3/1970 | Wenig | F24F 1/0071 | 454/202 |
| 3,830,450 | A * | 8/1974 | Williams | B64C 3/141 | 244/207 |
| 3,885,891 | A * | 5/1975 | Throndson | F04D 25/08 | 417/196 |
| 4,332,529 | A * | 6/1982 | Alperin | F02K 1/36 | 417/167 |
| 4,448,354 | A * | 5/1984 | Reznick | B64C 29/00 | 239/265.17 |
| 4,466,819 | A * | 8/1984 | Dunn | C03B 37/06 | 65/463 |
| 4,628,618 | A * | 12/1986 | Virta | D21F 5/042 | 34/116 |
| 4,856,968 | A * | 8/1989 | Armbruster | F04D 25/08 | 417/360 |
| 6,073,881 | A * | 6/2000 | Chen | B64C 39/001 | 244/12.2 |
| 6,321,034 | B2 * | 11/2001 | Jones-Lawlor | F04D 25/105 | 392/367 |
| 7,699,580 | B2 * | 4/2010 | Lasko | F24H 3/0417 | 415/102 |
| 8,992,174 | B2 * | 3/2015 | Chang | F04F 5/16 | 415/206 |
| 2004/0022631 | A1 * | 2/2004 | Birdsell | F04D 25/105 | 416/110 |
| 2004/0120815 | A1 * | 6/2004 | Lasko | F24H 9/1872 | 415/213.1 |
| 2010/0226752 | A1 | 9/2010 | Gammack et al. | | |
| 2010/0226797 | A1 * | 9/2010 | Fitton | F24F 1/01 | 417/313 |
| 2013/0111777 | A1 * | 5/2013 | Jeong | A45D 20/12 | 34/97 |
| 2015/0136997 | A1 | 5/2015 | Kubo et al. | | |

FOREIGN PATENT DOCUMENTS

| | | | | |
|---|---|---|---|---|
| FR | 3065752 | A1 * | 11/2018 | F01P 5/02 |
| GB | 2500017 | A * | 9/2013 | F04F 5/16 |
| JP | 2014134325 | A * | 7/2014 | |
| JP | 2015063979 | A * | 4/2015 | F04D 29/681 |
| WO | WO-2012/017220 | A1 | 2/2012 | |
| WO | WO-2012033517 | A1 * | 3/2012 | F04F 5/16 |

OTHER PUBLICATIONS

Li et al. Influence of Coanda surface curvature on performance of bladeless fan, Journal of Thermal Science vol. 23, No. 5 (2014) 422-431 (Year: 2014).*

International Search Report and Written Opinion for PCT/EP2017/061960, dated Sep. 12, 2017.

International Search Report and Written Opinion for PCT/EP2017/061965, dated Jul. 24, 2017.

* cited by examiner

FAN FOR VENTILATING OR CONDITIONING ENVIRONMENT

FIELD OF THE INVENTION

The present invention concerns a fan usable in closed domestic or public places, to create a stream of air for ventilating or conditioning the surrounding environment.

The term fan as used hereafter is intended to mean, in a broader sense, any apparatus whatsoever able to supply ventilation, conditioning, cooling, heating, thermo-ventilation, dehumidification or purification of the air.

BACKGROUND OF THE INVENTION

Fans for rooms are known, substantially configured as a column, with a containing structure which houses the mechanical components that generate the stream of ventilation or conditioning air, and a zone from which the stream of air is emitted, comprising one or more exit apertures through which the stream is emitted toward the environment.

In the most typical and widespread solutions, the exit aperture is generally located in sight on the front part of the structure of the fan, often making the technical components partly visible, for example the ventilation blades and/or the possible heating means.

This can give the fan an unpleasant esthetic effect, preventing the manufacturer from obtaining a clean profile, without discontinuities and thus lowering the esthetic value of the fan.

Furthermore, since the technical components face directly toward the space, they are more subject to contact with dust or other dirt that can compromise the functioning thereof.

Portable fans are also known, which do not have the internal components visible or partly visible, or that do not have ventilation blades, but which have a stream of air confined to a limited portion of space.

In particular, the stream of air is greatly limited in its distribution in the space, which reduces its applicability and effectiveness.

Another disadvantage of many of the known solutions is that the air entering the fan is taken in a lower zone, where there is the motor, substantially in correspondence with or near the base of the fan.

In this way, as well as taking in the air from the space, the fan also takes in the dust which is present in large quantities on the base surface where the fan is rested.

Document CN-A-104.863.871 for example describes a fan comprising a support base provided with an air suction chamber, and a body that develops in a vertical direction, communicating with the support base and provided with a plurality of slits made in the longitudinal direction, through which the stream of air generated is emitted outside, in a direction imparted by deflector elements provided in correspondence with the slits. In the solution described in CN-A-104.863.871, the entrance apertures for the air and the means to generate a stream of air are necessarily provided in the support base, under the slits through which the air exits, because the geometry and configuration of the vertical body do not allow a different disposition of these components.

Document WO-A-2012/017220 describes a fan comprising a body provided with apertures for the air to enter, inside which body means to generate a stream of air are disposed, and a casing with an annular shape, provided with at least a first aperture to emit a first portion of the stream of air and at least a second aperture to emit a second portion of the stream of air. Due to the disposition of the air entrance apertures and the means to generate the stream of air, constrained by the configuration of the fan, the air sucked in can contain dust or impurities that tend to deposit in correspondence with the ground.

Document CN-A-105.351.230 describes a fan that exploits the Coanda effect to emit a stream of air toward a user. The fan comprises a chamber provided with holes for the air to enter, inside which chamber the means to generate the stream of air are provided and on which a Coanda-type deflector is disposed with a section comprising an arched portion and a V-shaped portion, and provided with slits for the stream of air to exit in correspondence with the arched portion, which deflect the stream of air toward the tip of the V. The solution described provides that the entrance holes and the means to generate the stream of air are disposed in correspondence with the lower part of the fan, but this causes the same problems as described above.

The solution described in US-A-2015/0136997 concerns a fan device provided with a housing for the main body with a column shape, provided with an entrance aperture for the air in a rear zone, and with an exit aperture defined by a slit made longitudinally in a front wall of the housing of the main body. The fan device comprises a blowing device disposed in the lower part of the housing of the main body, configured to make the air circulate from the entrance aperture to the exit aperture from the bottom upward.

One purpose of the present invention is to obtain a fan that overcomes the disadvantages of known fans.

Another purpose of the present invention is to obtain a fan that returns a distributed stream of air at uniform temperature, able to guarantee maximum comfort to the people in the space where it is positioned.

Another purpose is to obtain a fan that requires minimum maintenance operations with reduced frequency.

Another purpose is to obtain a fan that allows to vary the amplitude of the stream of air at exit.

Another purpose of the present invention is to obtain a fan with great esthetic value, having a front surface without discontinuities and defining a closed profile without apertures to access the internal zone where there are the functional components of the fan.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, the present invention concerns a fan for the emission of a stream of air into a space.

The fan comprises a main body with a vertical development with respect to a support base on which it is located in a condition of use, said main body defining an internal housing compartment.

According to one aspect of the present invention, the fan has a longitudinal aperture disposed in its rear zone, for the emission of the stream of air toward the outside, and also comprises an air suction and distribution unit, located, at least for a substantial part thereof, above the beginning of the longitudinal aperture, and a channeling element positioned in proximity to the longitudinal aperture and cooperating with it to determine the exit of the stream of air through the longitudinal aperture, so that the exiting stream of air adheres to the external surface of the main body and is conveyed toward the front of the fan.

According to another aspect of the invention, the external surface of the main body has a rounded geometry substantially without discontinuities so that the stream of air, exiting from the rear part of the fan, is conveyed adherent toward the front part and then toward the external environment to be ventilated or conditioned.

According to another aspect, the channeling element has or is associated with means suitable to subdivide the stream of air exiting from the longitudinal aperture into two streams with opposite directions, so that the streams separate substantially in correspondence to the longitudinal aperture and are separately conveyed adhering to the external surface of the main body, toward the front part of the fan, where they are at least partly rejoined and spread into the environment.

In this way, advantageously, a fan can be obtained that does not need blades, in which the internal components are not visible to the user and whose visible surface is without discontinuities, with a rounded profile that, as well as providing a pleasant esthetic appearance, is functional for the emission and distribution of streams of air into the space.

The invention also concerns a method to determine a stream of air exiting from the fan.

BRIEF DESCRIPTION OF THE DRAWINGS

These and other characteristics of the present invention will become apparent from the following description of some embodiments, given as a non-restrictive example with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 1:
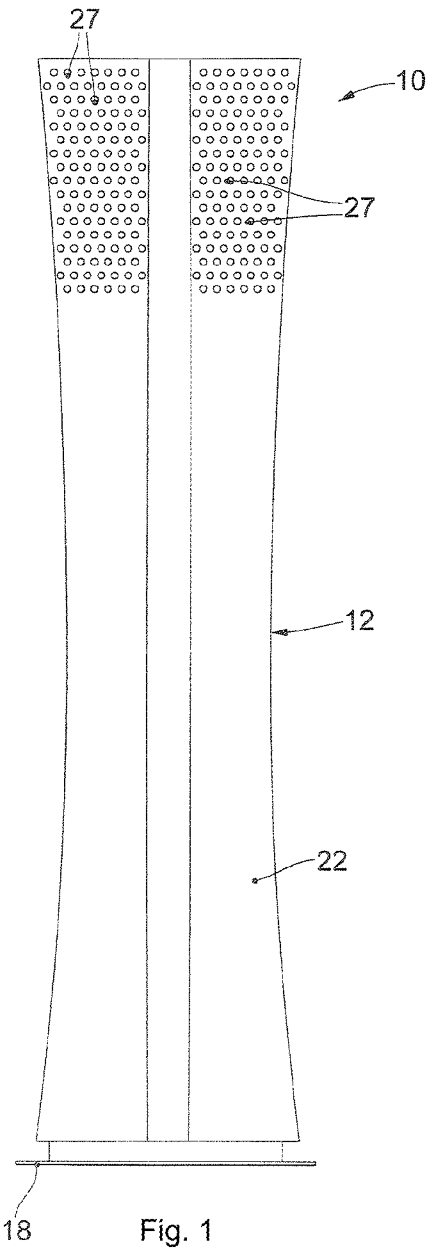
FIG. 1 is a front elevation view of a fan according to one embodiment of the present invention.

Embodiments described here with reference to FIGS. 1-6 concern a fan 10 usable in particular in closed spaces for ventilating air at room temperature, for cooling, heating, thermo-ventilating, dehumidifying or purifying air.

The fan 10 comprises a main body 12 with a vertical development with respect to a support base 18 on which it is positioned during use.

The main body 12 defines inside it a compartment 13 for housing functional components.

The fan 10 has a longitudinal aperture 16, disposed in the rear part of the main body 12, and comprises a unit 14 to take in and distribute a stream of air W.

The air suction and distribution unit 14 is located, at least for a substantial part, above the beginning of the longitudinal aperture 16.

The longitudinal aperture 16 is disposed on the opposite side with respect to the space to be conditioned. In particular, the longitudinal aperture 16 is located in the rear part of the fan 10, and the stream of air W exiting from the longitudinal aperture 16 is deflected so as to reach the front zone located at the front of the fan 10, as indicated by arrows F in FIGS. 3 and 4.

In general, the expressions "rear part" and "front zone" are only intended to define a functional relationship between these two parts, which have to be substantially opposite each other with respect to the main body 12 and the user.

According to some embodiments, the air suction and distribution unit 14 comprises a rotor 15 provided with suitably oriented blades to determine the suction of the air from the outside and its entrance into the main body 12.

The rotor 15 can be designed for example to obtain a centrifugal fan, an axial fan or a mixed axial-centrifugal fan.

The air suction and distribution unit 14 also comprises a drive member 17 connected to the rotor 15 by means of a drive shaft located in correspondence with the center of the rotor 15.

The fan 10 also comprises a channeling element 20 positioned near the longitudinal aperture 16 and cooperating with it to direct the stream of air W toward the outside.

The channeling element 20 is configured so as to allow the stream of air W exiting from the longitudinal aperture 16 to adhere to an external surface 22 of the main body 12. In other words, the channeling element 20 is able to deflect the stream of air W exiting from the longitudinal aperture 16.

The channeling element 20 comprises an active surface 20*a* which, during use, is struck by the stream of air W exiting from the longitudinal aperture 16. The active surface 20*a* can have a convex shape.

Figure 3:
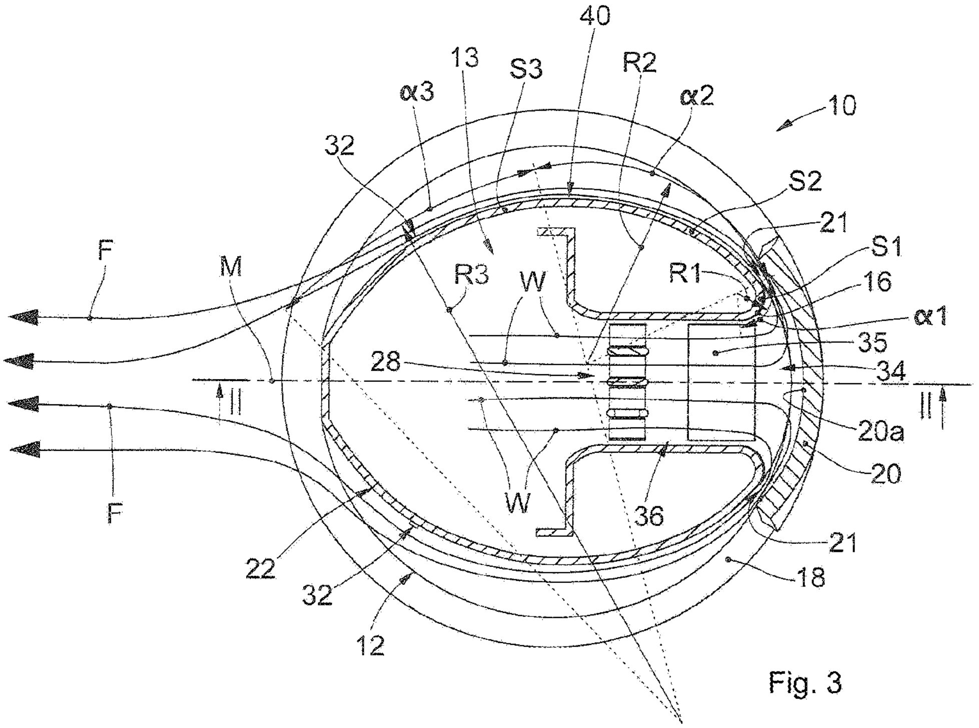
FIG. 3 is a cross section of the fan in FIG. 2.
Figure 4:
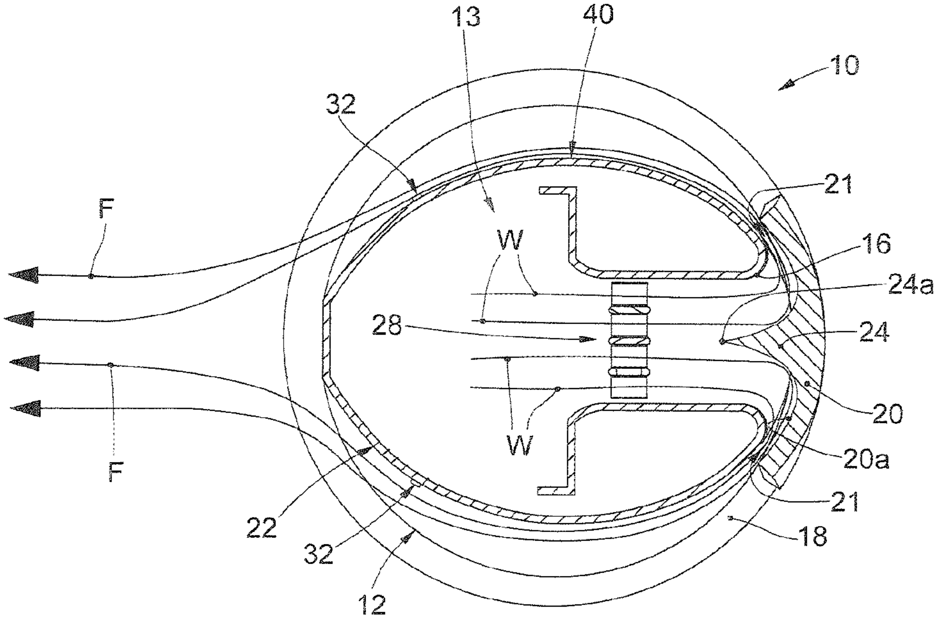
FIG. 4 is a cross section of a variant of the fan in FIG. 2.

The channeling element 20 makes the stream of air W exiting from the longitudinal aperture 16 in its travel toward the front zone of the fan 10 follow the profile of the external surface 22 and be conveyed toward the front of the fan 10, as can be seen better in FIGS. 3 and 4.

Furthermore, in cooperation with the external surface 22, the channeling element 20 is configured to determine a minimum passage section of the stream of air W exiting from the compartment 13.

In one formulation of the invention, the external surface 22 has a rounded geometry, substantially without any discontinuities, so that the stream of air W, exiting from the rear part of the fan 10, is conveyed adherent toward the front part and then toward the space to be ventilated or conditioned.

Within the field of the present invention, the rounded geometry can be defined by a cross section that is substantially circular, regular oval, drop-shaped, compressed, or such as to obtain a profile of the main body 12 that is substantially drop-shaped or wing-shaped, or any other shape, even different from circular, suitable to convey the stream of air W adherent to the external surface 22 without creating significant variations in the development of the stream, and without creating disturbances, turbulence, discontinuities or any other factor that could disturb the development of the stream.

The air enters inside the main body 12 through entrance holes 27 made at least above the longitudinal aperture 16, in the top part and/or on the upper lateral wall of the main body 12.

The compartment 13 allows to channel inside the fan 10 the stream of air W from the entrance holes 27 toward the longitudinal aperture 16.

According to a preferred embodiment, the main body 12 can be configured to have a substantially cylindrical shape for the whole of its height.

In this way, the main body 12 has a circular cross section shape, that is, without sharp edges and advantageously it is possible to make the stream of air W transit adherent to the external surface 22 at exit from the longitudinal aperture 16, exploiting the Coanda effect.

According to one embodiment shown by way of example in FIG. 1, the main body 12 can have a tapered shape in at least part of its vertical development.

In particular, according to an advantageous formulation, the main body 12 has on its height a narrowing in section substantially in correspondence with the longitudinal aperture 16.

In this way, thanks to the fact that in correspondence with the longitudinal aperture 16 a regular oval profile is formed, or drop-shaped, compressed, or wing-shaped, the stream of air W is kept adherent to the external surface 22 for a greater segment than it would be if the section were circular and constant for the whole height of the main body 12. Consequently, the stream of air W that strikes the user will be more intense and less turbulent.

In this variant embodiment, the diameter inside which the cross section of the main body 12 is inscribed can be comprised in a range from 100 mm to 230 mm and the height of the main body 12 can be comprised in a range between 750 mm and 850 mm.

The main body 12 can be configured to have a continuous surface in the front part, while in correspondence with the longitudinal aperture 16 it has a profile folded toward the inside, to define the longitudinal aperture 16 itself.

In this way, the particular rounded geometry of the main body 12 in correspondence with the longitudinal aperture 16 allows to convey the stream of air W adherent to the external surface 22, so as to form a surface film that is propagated then toward the front of the fan 10.

According to possible embodiments, described for example with reference to FIG. 3, the main body 12 can have a geometric cross section with a profile 40 defined by a polyline, which can be approximated by a plurality of convex arc segments S1, S2, S3, . . . SN located one after the other.

In particular, the polyline profile 40 is configured to generate a stream of air in the front part of the fan 10 such as to guarantee a high level of comfort for a user.

According to some embodiments, the profile 40 of the characteristic section has a symmetrical shape with respect to a median plane M of the fan 10 which joins the front part and rear part where there is the longitudinal aperture 16.

It should be noted that the profile 40 can affect only one zone of the main body 12, in particular that zone where the longitudinal aperture 16 is made.

In some embodiments, the longitudinal aperture 16 and the profile 40 can affect the whole longitudinal (vertical) development of the main body 12, or only one portion thereof.

According to some embodiments, in the direction of the stream of air from the longitudinal aperture 16 to the front part of the fan 10, the successive convex arc segments have a progressively decreasing amplitude and a progressively increasing radius of curvature.

According to some embodiments, the convex arc segments S1, S2, S3, . . . SN are tangent to each other.

According to some embodiments, for example shown with reference to FIG. 3, the profile 40 can be approximated by at least three convex arc segments S1, S2, S3.

Even if in the following description we refer by way of example to three arc segments, it is clear that there can be any number N of convex arc segments, for example five, seven, ten, twenty, one hundred or more, provided that the convex arc segments have a progressively decreasing amplitude with respect to each other in the direction of the stream of air, and a progressively increasing radius of curvature.

According to some embodiments, the first convex arc segment S1 can extend for an amplitude corresponding to a first angle $\alpha$1, comprised for example between 110° and 150°, and can have a first radius of curvature R1 comprised between 5 mm and 10 mm. In particular, the first radius of curvature R1 can be comprised between 6 mm and 8 mm. For example the first radius of curvature R1 can be comprised between 6.8 mm and 7.2 mm.

According to other embodiments, the first convex arc segment S1 can extend for an amplitude corresponding to a first angle $\alpha$1, comprised between 120° and 140°, and can have a first radius of curvature R1 which can be comprised for example between 6.9 mm and 7.1 mm.

According to other embodiments, the second convex arc segment S2 can extend for an amplitude corresponding to a second angle $\alpha$2, comprised for example between 50° and 70°, and can have a second radius of curvature R2 comprised between 25 mm and 45 mm. In particular, the second radius of curvature R2 can be comprised between 30 mm and 40 mm.

According to other embodiments, the second convex arc segment S2 can extend for an amplitude corresponding to a second angle $\alpha$2, comprised between 55° and 65°, and can have a second radius of curvature R2 comprised between 32 mm and 37 mm.

According to some embodiments, the third convex arc segment S3 can extend for an amplitude corresponding to a third angle $\alpha$3, comprised for example between 20° and 40°, and can have a third radius of curvature R3 comprised between 80 mm and 130 mm. In particular, the third radius of curvature R3 can be comprised between 90 mm and 120 mm.

According to other embodiments, the third convex arc segment S3 can extend for an amplitude corresponding to a third angle $\alpha$3, comprised between 25° and 35°, and can have a third radius of curvature R3 comprised between 100 mm and 110 mm, more particularly it can be comprised for example between 104 mm and 106 mm.

According to some embodiments, the second convex arc segment S2 is tangent at one end with the first convex arc segment S1 and at the opposite end with the third convex arc segment S3, so that the profile 40 has a development without discontinuities.

According to other embodiments, it can be provided that each convex arc segment S1, S2, S3 itself consists of a plurality of arc sub-segments, which in their entirety approximate the respective arc segments S1, S2, S3. Each arc sub-segment has, with respect to the previous segment (in the direction of the stream of air W) a progressively decreasing amplitude and a progressively increasing radius of curvature.

For example, according to a possible embodiment, not shown, it can be provided that instead of the first convex arc segment S1, two arc sub-segments are disposed one after the other, and extend for respective amplitudes, for example with angles of 67° and 63°, and in which the respective radii of curvature can vary for example from 6.8 mm to 7 mm and from 7 mm to 7.2 mm.

According to some other embodiments, the curvature of the first convex arc segment S1 cooperates with the channeling element 20 to define an exit passage 21 for the stream of air.

According to other embodiments, the channeling element 20 can have an arched shape, with a radius of curvature suitable to cooperate with the first arc segments to define an exit passage 21 on each side of the median plane M.

According to some embodiments, the channeling element 20 can have a curvilinear profile, which can be positioned above the portion of the external surface 22 in correspondence with the longitudinal aperture 16.

In one embodiment, the channeling element 20 has a longitudinal development at least equal to the extension of the longitudinal aperture 16.

Figure 2:
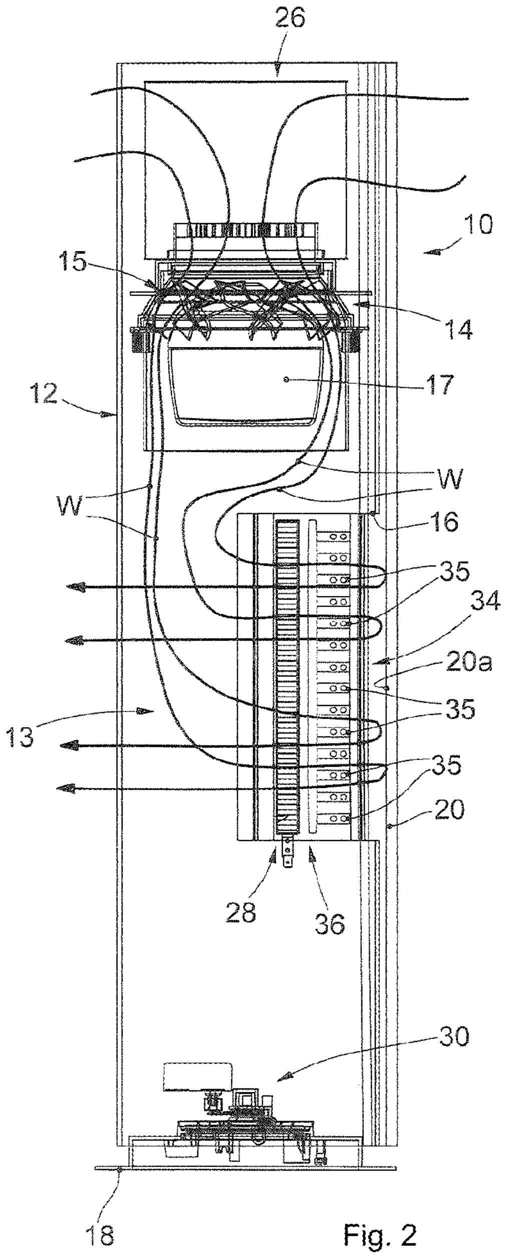
FIG. 2 is a view in section of the fan in FIG. 1 taken according to the section plan II-II visible in FIG. 3.

In another embodiment, shown in FIG. 2, the channeling element 20 has a vertical development equal to the development of the main body 12.

In another embodiment, shown by way of example in FIG. 4, the channeling element 20 can provide a separator element 24 configured to determine a separation substantially into two halves of the stream of air W exiting from the longitudinal aperture 16.

According to some embodiments, the separator element 24 can have in section a triangle or arrow shape, with an apex 24*a* facing toward the longitudinal aperture 16 and the base facing toward the channeling element 20.

According to other embodiments, the separator element 24 can have concave sides, arched toward the inside.

In some embodiments, the apex 24*a* can be rounded or beveled.

The presence of the separator element 24 allows to obtain a progressive reduction in the transit section of the air, which is maximum in correspondence with the longitudinal aperture 16, that is, on the apex 24*a* of the separator element 24, and is minimum in correspondence with the end of the exit passage 21, that is, in correspondence with the outermost end of the channeling element 20.

The reduction in section between the apex 24*a* of the separator element 24 and the passage 21 can therefore determine an increase in the speed of the stream of air W toward the outside and toward the front part of the fan 10.

In this way two streams of air W are created, with opposite directions, each of which, exiting from a respective passage 21, adheres with a respective portion of the external surface 22 of the main body 12, with the streams substantially combining again on the front of the fan 10.

According to some embodiments, the passage 21 is conformed as a narrowing in section for the passage of the stream of air W.

According to some embodiments, each passage 21 has a width comprised between about 0.1 mm and 50 mm.

According to some embodiments, the passage 21 has a width comprised between about 1 mm and about 20 mm.

According to other embodiments, the passage 21 has a width comprised between about 3 mm and about 10 mm.

The width of the passage 21 thus designed allows to supply a stream of air toward the user with a speed suitable to confer on the user a sensation of optimum comfort at the desired distance.

In particular, the speed of the stream of air at exit is such as to optimize both the effectiveness of the functioning of the fan 10 and the comfort of the user.

According to other embodiments, the external surface 22 of the main body 12, at least in correspondence with the zone affected by the longitudinal aperture 16, has a surface finish suitable to eliminate, or at least reduce, possible wrinkles and roughness, so as to prevent turbulence in the stream of air, thus guaranteeing a high level of comfort for the user.

According to some embodiments, the external surface 22 can have a surface roughness comprised between 0.001μ and 100μ, measured in terms of Ra, Rz and Rq.

According to one embodiment, preferably in a substantially front zone, that is, facing toward the space to be conditioned or ventilated, the main body 12 can have interference and diversion means 32, configured to cause a diversion of the stream of air W in order to make its adherence to the external surface 22 at least partly terminate, and/or to determine a jet of air to be modulated in amplitude, according to requirements.

The interference means 32 can be installed at any point whatsoever on the height of the main body 12, to modulate the amplitude of the stream of air W and/or the jet of air that hits the space where it is located.

According to some embodiments, the interference means 32 are the mechanical type.

Figure 5:
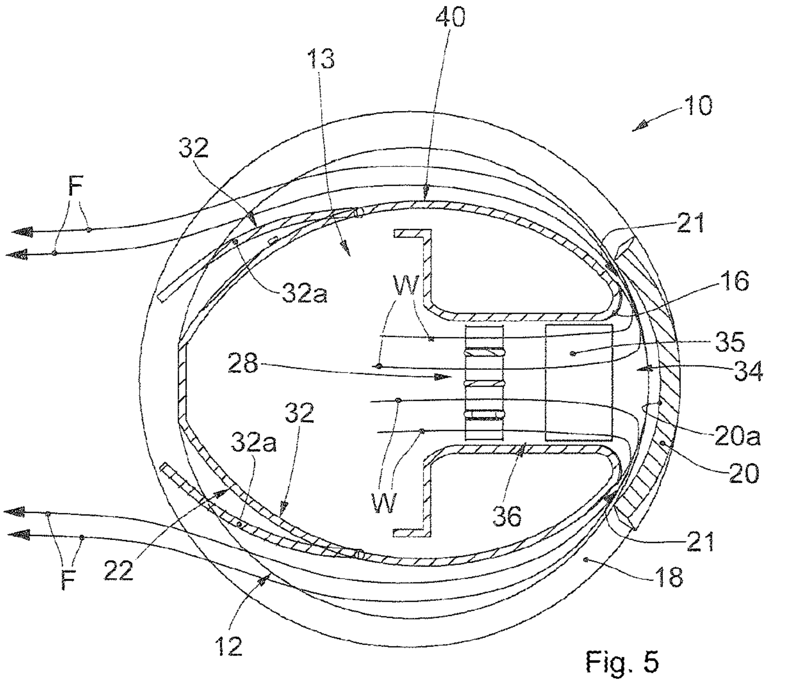
FIG. 5 is a cross section of a variant of the fan in FIG. 2.

According to some embodiments, for example described with reference to FIG. 5, the mechanical interference means 32 can comprise mechanical interference members 32*a*, for example longitudinal fins, adjustable as desired, that is, having a shape similar to that of the flaps of an airplane.

The mechanical interference members 32*a* can be configured as flaps, or moving surfaces with a shape similar to the surface that supports them, and configured to deflect the stream of air toward the outside.

According to some embodiments, the mechanical interference members 32*a* can be rotated from a position substantially parallel to the external surface 22 of the main body 12 to a position substantially perpendicular thereto.

According to other embodiments, the interference means 32 are the aerodynamic type.

Figure 6:
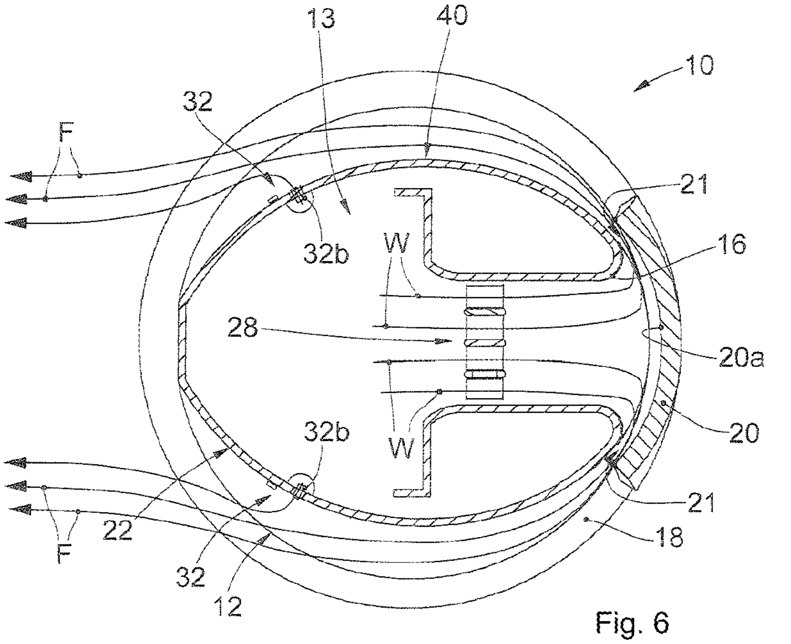
FIG. 6 is a cross section of a variant of the fan in FIG. 2.

According to these embodiments, for example shown by way of example in FIG. 6, aerodynamic interference members 32*b* can be provided, such as nozzles, or shaped holes, which generate jets of air with an angled direction with respect to the external surface 22, for example substantially perpendicular, to deflect or perturb the main stream of air and cause it to be propagated in the space.

According to one embodiment, shown by way of example in FIG. 2, the fan 10 can also comprise a filtering element 26.

The filtering element 26 can be installed upstream of the air suction and distribution unit 14 and in correspondence with the entrance holes 27, so that the air sucked in can be suitably cleaned and purified of dust or particular allergens present in it.

The position of the filtering element 26 substantially at the top of the overall structure of the fan 10 facilitates its access for possible maintenance and replacement interventions, also thanks to the particular conformation of the main body 12.

According to another embodiment, shown by way of example in FIG. 2, the fan 10 can comprise a conditioning device 28 installed inside the main body 12 and in substantial correspondence with the longitudinal aperture 16.

The conditioning device 28 can be any device whatsoever, able to modify the condition of the stream of air W to supply a determinate effect inside the space where it is emitted by the fan 10.

For example, the conditioning device 28 can supply heating, cooling or dehumidification of the stream of air W, or also a combination of these in the case of a fan 10 designed to perform diverse functions according to requirements.

The conditioning device 28 is installed, in the case shown here, upstream of the channeling element 20.

According to one embodiment, shown by way of example in FIG. 2, the conditioning device 28 can be installed immediately upstream of the longitudinal aperture 16.

According to another embodiment, the conditioning device 28 can be installed downstream of the longitudinal aperture 16.

According to embodiments described here, the fan 10 comprises a deflector device 34 provided with a plurality of deflector elements 35 to convey the stream of air through the longitudinal aperture 16 and toward the channeling element 20.

According to another embodiment, shown by way of example in FIGS. 2 and 3, the fan 10 can comprise an adjustment device 36 which cooperates with the deflector device 34 to determine the desired orientation of the deflector elements 35, in order to modulate the direction of the stream of air W.

In one embodiment, the adjustment device 36 can determine the rotation of the deflector elements 35 from a position substantially parallel to the support base 18 to a position substantially perpendicular to the support base 18.

According to another embodiment, shown by way of example in FIG. 2, the fan 10 also comprises a device 30 to rotate the main body 12.

The rotation device 30 can be installed in correspondence with two different portions respectively of the main body 12 and the support base 18.

The rotation device 30 is provided with a kinematism that determines the rotation of the main body 12 with respect to the support base 18 by a desired angle of rotation.

In this way the rotation device 30, when driven, for example remotely, by a button or by any other known system, determines the movement of the main body 12 around an axis, to determine its position or to drive a continuous rotation movement.

It is clear that modifications and/or additions of parts may be made to the fan 10 as described heretofore, without departing from the field and scope of the present invention.

It is also clear that, although the present invention has been described with reference to some specific examples, a person of skill in the art shall certainly be able to achieve many other equivalent forms of fan, having the characteristics as set forth in the claims and hence all coming within the field of protection defined thereby.

The invention claimed is:

1. A fan comprising:

a main body with a vertical development with respect to a support base on which the main body is located in a condition of use, said main body including an external surface having a rounded geometry and defining only one internal housing compartment having only one longitudinal aperture disposed in a rear zone of the internal housing compartment, the longitudinal aperture arranged for the emission of an exiting stream of air directed outwardly; and an air suction and distribution unit located completely above a beginning of said longitudinal aperture, and including a channeling element positioned in proximity to said longitudinal aperture and outside of the main body; wherein the channeling element is configured to deflect and separate the exiting stream of air exiting from the longitudinal aperture, cooperate with the longitudinal aperture to determine an exit of the exiting stream of air through said longitudinal aperture, and cooperate with the external surface of the main body to determine a minimum passage section of the exiting stream of air exiting from the internal housing compartment, so that said exiting stream of air adheres to the external surface of the main body and is conveyed toward a front of the fan.

2. The fan as in claim 1, wherein said external surface of said main body has a rounded geometry substantially without discontinuities so that the exiting stream of air is conveyed adherent toward the front of the fan and then toward an external environment to be ventilated or conditioned.

3. The fan as in claim 2, wherein said channeling element has or is associated with a separator to subdivide said exiting stream of air into two streams with opposite directions, so that said two streams are separately conveyed adhering to said external surface of the main body, toward the front of the fan, where the two streams are at least partly rejoined and spread into the external environment.

4. The fan as in claim 2, wherein said rounded geometry is formed at least in part by a plurality of convex segments tangent to one another.

5. The fan as in claim 4, wherein the rounded geometry comprises a polyline approximated by a plurality of convex arc segments located one after the other, wherein said convex arc segments have a progressively increasing radius of curvature, and a progressively decreasing amplitude in a direction from said longitudinal aperture toward the front of the fan.

6. The fan as in claim 1, wherein said channeling element has a curvilinear profile which overlaps a portion of said external surface of the main body.

7. The fan as in claim 1, wherein said channeling element, in cooperation with the external surface of the main body, is configured to determine a minimum section for a passage of said exiting stream of air.

8. The fan as in claim 1, wherein said main body has, on said external surface, interference and diverting means of the stream of air.

9. The fan as in claim 8, wherein said interference means are mechanical.

10. The fan as in claim 8, wherein said interference means are aerodynamic.

11. The fan as in claim 1, comprising a filtering element located upstream of said suction and distribution unit and in correspondence with entrance holes of the stream of air.

12. The fan as in claim 1, comprising a conditioning device installed inside said main body and in correspondence with said longitudinal aperture.

13. The fan as in claim 12, wherein said conditioning device is selected from a group consisting essentially of comprising a heating device, a cooling device, a dehumidifying device, and combinations thereof.

14. The fan as in claim 1, comprising a deflector device with a plurality of deflector elements and associated with an adjustment device configured to impart a rotation and a variation in inclination to said deflector elements.

15. The fan as in claim 1, comprising a rotation device installed at one end inside said main body and at an opposite end to said support base.

16. The fan as in claim 1, wherein said channeling element comprises a separator element configured to determine a separation of said exiting stream of air into two portions.

17. A method for the circulation of a stream of air by means of a fan comprising a main body with a vertical development with respect to a support base on which the main body is located in a condition of use, said main body including an external surface having a rounded geometry and defining only one internal housing compartment having only one longitudinal aperture, the method comprising:

sucking air from an external environment by means of a suction and distribution unit located completely above a longitudinal aperture, with a majority of an extent of the suction and distribution unit disposed above an upper end of the longitudinal aperture;

distributing a stream of air in said compartment from said suction and distribution unit toward said longitudinal aperture;

making said stream of air exit from said longitudinal aperture;

diverting and separating said stream of air by means of a channeling element positioned in proximity to said longitudinal aperture and outside the main body, the channeling element cooperating with the external surface of the main body to determine a minimum passage section of the stream of air exiting from the internal housing compartment; and making said stream of air adhere to the external surface of said main body.

18. A fan comprising:

a main body with a vertical development with respect to a support base on which the main body is located in a condition of use, the main body being symmetrical about a median plane;

the main body defining only one internal housing compartment having only one longitudinal aperture facing rearwardly from the internal housing compartment, the longitudinal aperture arranged for emission of an exiting stream of air directed rearwardly out of the main body;

an air suction and distribution unit located completely above an upper extent of the longitudinal aperture;

a channeling element positioned in proximity to the longitudinal aperture and outside of the main body and cooperating with the longitudinal aperture and arranged to deflect and divide the rearwardly directed exiting stream flowing rearwardly and parallel to the median plane into two streams of air directed in opposite directions relative to the median plane and further to channel the two streams of air so that the two streams are conveyed toward a front of the fan; and wherein the external surface of the main body has a rounded geometry cooperating with the channeling element to determine a minimum passage section of the exiting stream of air so that the two streams of air follow opposite sides of the rounded geometry of the external surface of the main body as they flow toward the front of the fan.

19. The fan as in claim 18, wherein the curved profile comprises a polyline formed by a plurality of successive convex arc segments located one after the other, wherein the convex arc segments have a progressively increasing radius of curvature.

20. The fan as in claim 19, wherein the channeling element includes a separator having an apex facing toward the longitudinal aperture.

* * * * *